United States Patent [19]

Kromer, III

[11] Patent Number: 4,541,045
[45] Date of Patent: Sep. 10, 1985

[54] MICROPROCESSOR ARCHITECTURE EMPLOYING EFFICIENT OPERAND AND INSTRUCTION ADDRESSING

[75] Inventor: Philip F. Kromer, III, Miami, Fla.

[73] Assignee: Racal-Milgo, Inc., Miami, Fla.

[21] Appl. No.: 304,017

[22] Filed: Sep. 21, 1981

[51] Int. Cl.³ .................................................. G06F 9/30
[52] U.S. Cl. .................................................. 364/200
[58] Field of Search ... 364/900 MS File, 200 MS File

[56] References Cited

U.S. PATENT DOCUMENTS

| | | | |
|---|---|---|---|
| 3,254,329 | 5/1966 | Lukoff et al. | 364/200 |
| 3,462,744 | 8/1969 | Tomasulo et al. | 364/200 |
| 3,820,079 | 6/1974 | Bergh et al. | 364/200 |
| 3,988,719 | 10/1976 | Whitby et al. | 364/200 |
| 4,041,461 | 8/1977 | Kratz et al. | 364/200 |
| 4,050,058 | 9/1977 | Garlic | 364/200 |
| 4,062,058 | 12/1977 | Haynes | 364/200 |
| 4,109,311 | 8/1978 | Blum et al. | 364/200 |
| 4,110,822 | 8/1978 | Porter et al. | 364/200 |
| 4,112,489 | 9/1978 | Wood | 364/200 |
| 4,149,245 | 4/1979 | Gannon et al. | 364/200 |
| 4,153,932 | 5/1979 | Dennis et al. | 364/200 |
| 4,164,787 | 8/1979 | Aranguren | 364/200 |
| 4,187,539 | 2/1980 | Eaton | 364/200 |
| 4,210,960 | 7/1980 | Borgerson et al. | 364/200 |
| 4,236,205 | 11/1980 | Kindseth et al. | 364/200 |
| 4,270,181 | 5/1981 | Tanakura et al. | 364/200 |
| 4,282,572 | 8/1981 | Moore, III et al. | 364/200 |
| 4,298,933 | 11/1981 | Shimokawa et al. | 364/200 |
| 4,298,936 | 11/1981 | Shapiro | 364/200 |
| 4,313,160 | 1/1982 | Kaufman et al. | 364/200 |
| 4,325,120 | 4/1982 | Colley et al. | 364/200 |
| 4,373,182 | 2/1983 | Schultz et al. | 364/200 |
| 4,374,410 | 2/1983 | Sakai et al. | 364/200 |
| 4,376,977 | 3/1983 | Bruinshorst | 364/200 |
| 4,399,507 | 8/1983 | Cosgrove et al. | 364/200 |

*Primary Examiner*—Thomas M. Heckler
*Attorney, Agent, or Firm*—Jackson & Jones

[57] ABSTRACT

A two-bus, two instruction type, pipelined microprocessor having a control means which orders application of instruction and data addresses to a memory and further interleaves instructions and data on a single bus to achieve maximum efficiency in operation.

16 Claims, 10 Drawing Figures

| ADDRESS | INSTRUCTION | | | |
|---|---|---|---|---|
| 0 | RRI ;1 | +1 | <MVP | AD> |
| 1 | RRI ;1 | -1 | <ADD | AO> |
| 2 | RR3 ;1 | 0 | <MVP | A1> |
| 3 | JUMP | | | |
| 4 | PCEQ | 80 | | |
| 5 | WRI ;1 | 0 | <ADD | A1> |
| 80 | L | <NEW> | <SUB | A1> |
| 81 | N | | | |
| 82 | ←————— IMMATERIAL —————→ | | | |
| 83 | ←————— IMMATERIAL —————→ | | | |

FIG. 6

TYPE II INSTRUCTION — INDIRECT READ @ INDEX REGISTER

| INDIRECT READ OPERATION | DISPLACEMENT TO BE ADDED TO INDEX REG. | REGISTER DESIGNATION | <MVP AO> (OPERATION) |
|---|---|---|---|

TYPE I INSTRUCTION — LOCAL OPERATION

| LOCAL OPERATION | INTERNAL REGISTER TO SELECT | <ADD AO> (OPERATION) |
|---|---|---|

FIG.4

| STATE | STATE | | | | DAR | NEXT STATE | NEXT STATE | | | | IRS-1.5 | PAB SELECT | DAB SELECT | DAB BUF SELECT | DAB BUF LOAD |
|---|---|---|---|---|---|---|---|---|---|---|---|---|---|---|---|
| | $Q_1$ | $Q_2$ | $Q_3$ | $Q_4$ | | | $Q_1$ | $Q_2$ | $Q_3$ | $Q_4$ | | | | | |
| 4 | 0 | 1 | 0 | 0 | X | 10 | 1 | 0 | 1 | 0 | 0 | 1 | 0 | 0 | 0 |
| 5 | 0 | 1 | 0 | 1 | X | 11 | 1 | 0 | 1 | 1 | 0 | 1 | 0 | 0 | 0 |
| 6 | 0 | 1 | 1 | 0 | 0 | 10 | 1 | 0 | 1 | 0 | 0 | 1 | 0 | 0 | 0 |
| | | | | | 1 | 11 | 1 | 0 | 1 | 1 | 0 | 1 | 0 | 0 | 1 |
| 10 | 1 | 0 | 1 | 0 | 0 | 12 | 1 | 1 | 0 | 0 | 1 | 1 | 0 | 0 | 0 |
| | | | | | 1 | 13 | 1 | 1 | 0 | 1 | 1 | 1 | 0 | 0 | 1 |
| 11 | 1 | 0 | 1 | 1 | 0 | 4 | 0 | 1 | 0 | 0 | 1 | 0 | 0 | 1 | 0 |
| | | | | | 1 | 5 | 0 | 1 | 0 | 1 | 1 | 0 | 0 | 1 | 1 |
| 12 | 1 | 1 | 0 | 0 | X | 14 | 1 | 1 | 1 | 0 | 1 | 1 | 0 | 0 | 0 |
| 13 | 1 | 1 | 0 | 1 | X | 6 | 0 | 1 | 1 | 0 | 1 | 0 | 0 | 1 | 0 |
| 14 | 1 | 1 | 1 | 0 | 0 | 14 | 1 | 1 | 1 | 0 | 1 | 1 | 0 | 0 | 0 |
| | | | | | 1 | 6 | 0 | 1 | 1 | 0 | 1 | 0 | 1 | 0 | 1 |

FIG.5

MICROPROCESSOR ARCHITECTURE EMPLOYING EFFICIENT OPERAND AND INSTRUCTION ADDRESSING

BACKGROUND OF THE INVENTION

The subject invention pertains to microprocessors, and particularly microprocessors used in signal processing where operations must be performed in real time at tremendously high rates, on the order of millions of operations per second. The subject invention pertains to a microprocessor architecture method and apparatus for operating at rates over two million operations per second.

A microprocessor configured according to the preferred embodiment employs two instructions types: those which do and those which do not require external memory fetch. Those instructions requiring no external memory fetch will be referred to as Type I instructions, while those requiring data to be fetched from external memory will be referred to as Type II instructions. Generally, Type II instructions are comprised of two parts: one part being the Operand-Fetch rule, the other being the Operation rule. A verbalization of a Type I instruction might be, for example, "Complement the Accumulator," while a verbalization of a Type II instruction might be, for example, "Fetch the contents of memory being pointed to by index register $R_3$ and add this number to the accumulator."

As alluded to, a very important measure of microprocessor performance, especially for signal processors, is the number of operations per second that can be performed. In order to maximize the number of operations per second, it is desirable to achieve maximum exploitation of each clock cycle as microprocessor operation. A well-known technique for more efficiently using each microprocessor cycle is so-called "pipelining" whereby one or more subsequent instructions are fetched before the execution of the first is completed.

It is also desirable to use few buses in the microprocessor architecture in order to reduce the number of input-output pins, simplify external memory and allow a von Neumann architecture wherein instruction and data memory may share the same devices.

The subject invention finds particular application in a microprocessor employing Type I and Type II instructions, pipelining and two buses—an address bus and instruction-data bus. In such a machine, the different types of instructions and delays involved lead to difficulties with organization of processing operations and thus to resultant waste of precious computing time, detracting from the number of operations per second which can be accomplished.

SUMMARY OF THE INVENTION

Accordingly, it is an object of the invention to enhance the computing power of microprocessors;

It is a further object to achieve synchronization of operation flow in a machine involving several different types of instructions so as to optimally utilize microprocessor cycles.

It is a more particular object of the invention to enhance the efficiency of a microprocessor employing a pipelined, two instruction type, two bus architecture.

These and other objects and advantages are accomplished according to the invention by provision of a means which controls the order of application of instruction and operand addresses to a memory and times the provision of the resultant instructions and operands to the arithmetic section in such a way that no available time slots on the memory address bus are unused.

The apparatus is organized such that the operand for instruction N, if required, is fetched immediately after the fetch of instruction N+K, where K is determined by the pipeline delay of the processor, and such that an instruction is fetched immediately after each operand fetch. In the preferred embodiment, this method is applied in a processor having a single memory, a single memory address bus, and a single bus for transferring the results of both operand and instruction fetches to the arithmetic and control sections. The control section in turn implements the address method by selecting the address sequence and coordinating application of instructions and operands to the arithmetic section.

Several advantages are achieved by the invention. First, instructions and data can be interleaved on the same bus. During every cycle a useful memory fetch is performed. Maximum flexibility in instruction encoding is allowed. The execution rate of instructions is as nearly uniform as possible.

DETAILED DESCRIPTION OF THE PREFERRED EMBODIMENT

Figure 1:
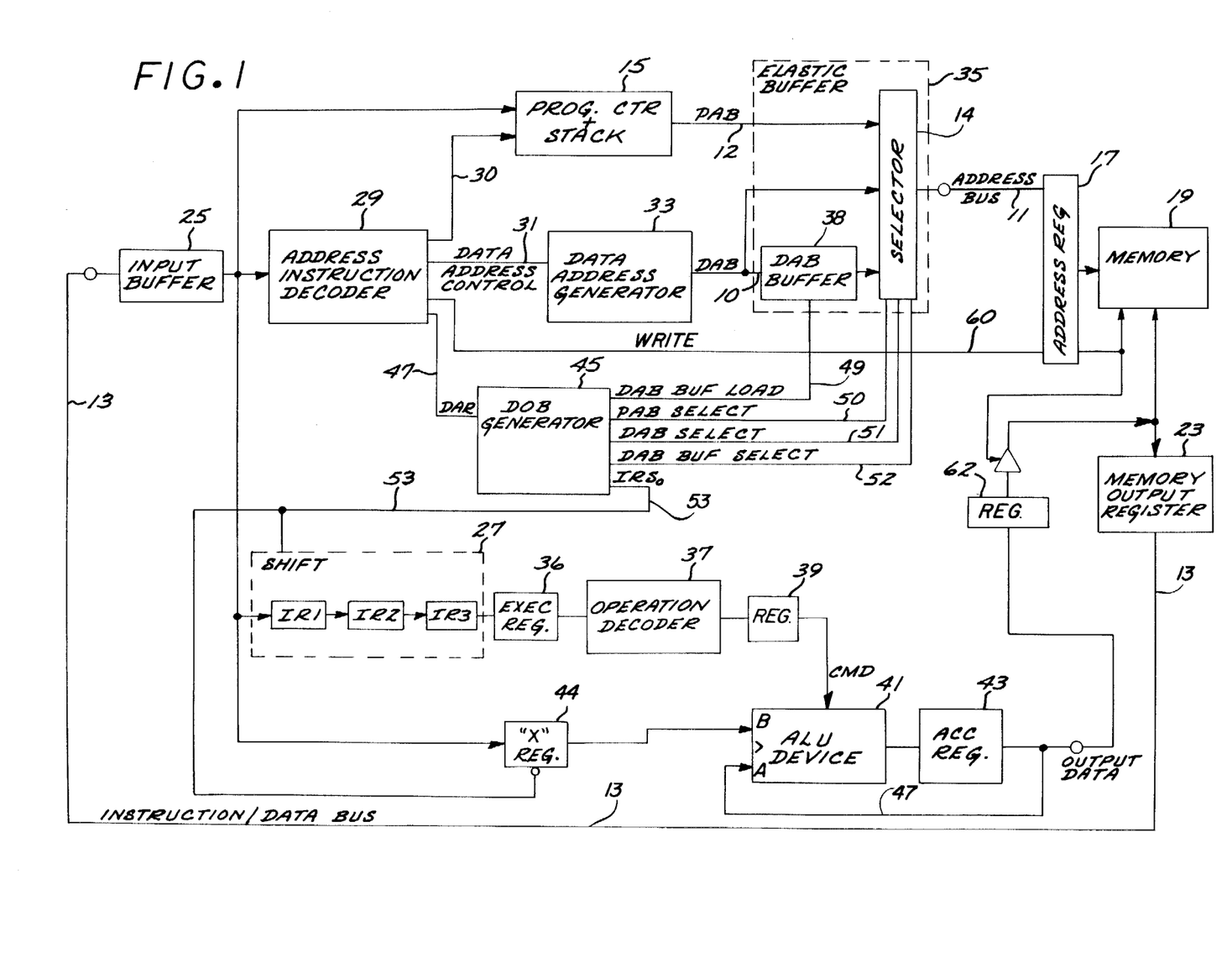
FIG. 1 shows a block diagram of the preferred embodiment of the invention.

The microprocessor structure of the preferred embodiment is shown in FIG. 1. As shown, this microprocessor employs two buses, a memory address bus 11 and an instruction/data bus 13.

The memory address bus 11 provides addresses, via an address register 17, to a memory 19. In response, the memory 19 outputs data and instructions to the instruction/data bus 13, via a memory output register 23.

A program counter and stack 15 provides program addresses to the address bus 11 over a program address bus (PAB) 12. A control line 30 to the program counter controls jumps, subroutine calls and returns.

In response to an address from the program counter and stack 15, the memory 19 may output a Type I or Type II instruction through the memory output register 23, over the instruction/data bus 13, to an input register 25. From the input register 25, the instruction is applied to an address instruction decoder 29 and is entered into an instruction register 27.

The address instruction decoder 29 decodes the operand-fetch portion of the instruction and applies the decoded output over a data address control line 31 to a data address generator 33. The data address generator 33 outputs a data address on the data address bus (DAB) 10 to an elastic buffer 35 which may store one data address for later application to the memory 19. The data address generator 33 preferably employs the technique of indirect addressing known in the art. The preferred embodiment employs four index registers each of which may generate an address. The address instruction decoder 29 selects the appropriate index register. In operation, the instruction under consideration may contain a command to read an index register and a displacement field. The address in the indicated index register is then read onto the data address bus 10 and concurrently its contents are incremented or decremented in accordance with the contents of the displacement field.

Some operand fetch rules may require performance of a write to memory operation. In this case the WRITE signal 60, via address register 17, conditions the memory 19 to write the data existing the accumulation register(s) 43 to the memory 19 via a register 62. This same data will appear on the instruction/data bus 13 in the same manner as the result of a read cycle.

Other address generation techniques are known and usable, and the invention is not limited to a specific technique.

As alluded above, an instruction on the instruction/data bus 13 is also placed in the instruction register 27 for eventual execution by the microprocessor. Execution is accomplished by conventional circuitry including an execution register 36, an operation decoder 37, a register 39, an arithmetic logic unit (ALU) 41, an accumulator 43 and a data register 44. The operation decoder 37 decodes the instruction and supplies the decoded output to the execution register 36. The data register 44 stores a data word which is required for execution of the command contained in the execution register 36. The loading of the data register 44 is controlled by an IRSO signal 53. The other data input to the ALU 41 is the output of the accumulator 43, transferred on a lead 47.

The arithmetic section may employ more than one accumulator and preferably has two. Thus, the "A" input to the ALU 41 may come from either the first or second accumulator. Preferably, an instruction is provided which will allow the output of either accumulator to be put back in memory 19. The ALU 41 itself typically involves several units of pipeline delay. As will be taught below, data in the preferred embodiment is timed to arrive at the B input of the ALU 41 simultaneously with the arrival of the appropriate command in register 39.

Figures 2A, 2B:
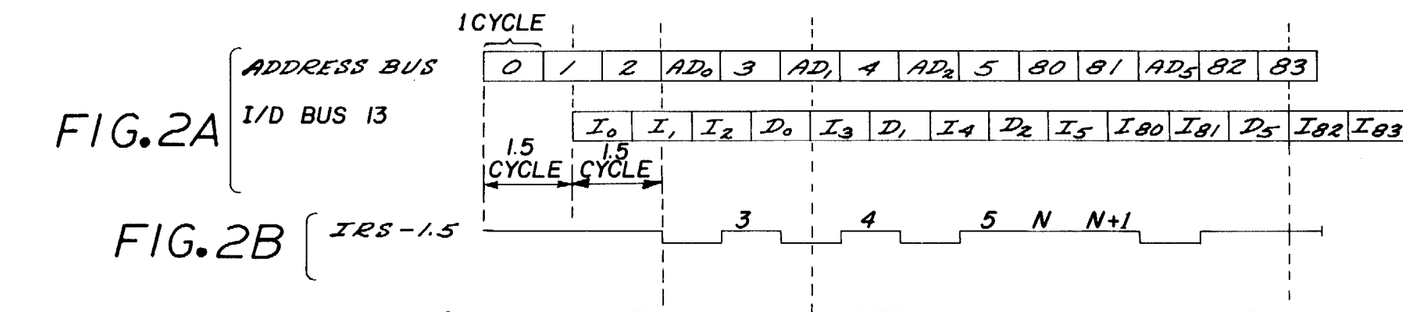
FIG. 2A illustrates the interleaving of instructions, data, and addresses and relative timing of appearance thereof on the address bus and instruction data bus of the preferred embodiment.
FIG. 2B illustrates the operation of the IRS-1.5 signal which serves as bus arbitrator.

Practical delays associated with the decoder 29 and associated combinatorial logic of the microprocessor dictate 1½ cycles for interpretation of the operand fetch rule and generation of the address of the operand. This minimum decoder delay is illustrated in FIG. 2A where it is shown that address $AD_o$ appears on the address bus 1½ cycles after instruction $I_o$ appears on the I/D bus 13 (and hence at the input of the input buffer 25 of the address instruction decoder 29). In addition, and also as illustrated in FIG. 2A, 1½ cycles are required for the memory to return the data, given the address. The total time, three cycles, is consistent with the preferred logic family, NMOS LSI, and constitutes the "pipeline delay" of the preferred embodiment. This logic type also dictates the maximum rate of the system operating clock.

Prior to discussion of the preferred technique for interleaving instructions and data, it should also be noted that several registers described above function as "framing" registers. Such registers do not store, but rather provide a suitable delay and, in addition, shape up and sharpen the signals transferred through them. The framing registers in FIG. 1 are the address register 17, the memory output register 23, the input buffer 25, the execution register 36, and the register 39 at the output of the operation decoder 37.

According to the invention, optimum interleaving of instruction addresses and data addresses on the address bus 11 and instructions and data on the instruction/data bus 13 is accomplished by means of a DOB (data on bus) generator 45. As shown, the DOB generator 45 receives an input from the address instruction decoder 29. This is the DAR (data address request) signal which occurs concurrently with production of a data address by the data address generator 33. The DAR signal on line 47 indicates whether the decoded instruction entails a data fetch or not.

The DOB generator 45 supplies five control signals on respective lines 49, 50, 51, 52, 53. The first control signal DAB BUF LOAD, line 49, determines when the DAB buffer 35 is to be loaded from the data address bus (DAB) 10.

The second, third and fourth control signals 50, 51, 52 are supplied to a selector gate 14 which selects the output to be supplied to the memory address register 17 over the memory address bus 11. The control signal PAB SELECT on line 50 determines whether a program address from the program address bus, (PAB) 12 is gated to the address register 17. It also increments the program counter 15. The control signal on the DAB SELECT line 51 determines whether the output of the data address generator is outputted to the address register 17. The control signal DAB BUF SEL, line 52, determines whether the output of the DAB Buffer 38 is outputted to the address register 17. Thus, the control signals 50 and 51 provide the "elasticity" of the buffer. Also, when the DOB generator causes a data address out, it inhibits the program counter 15.

The fifth control signal line 53 supplies the IRSO signal to the instruction register 27 and the data register 44. When the control signal IRSO is true, the instuction register 27 will be shifted. When the control signal IRSO is false, the data register 44 will be loaded.

Figure 4:
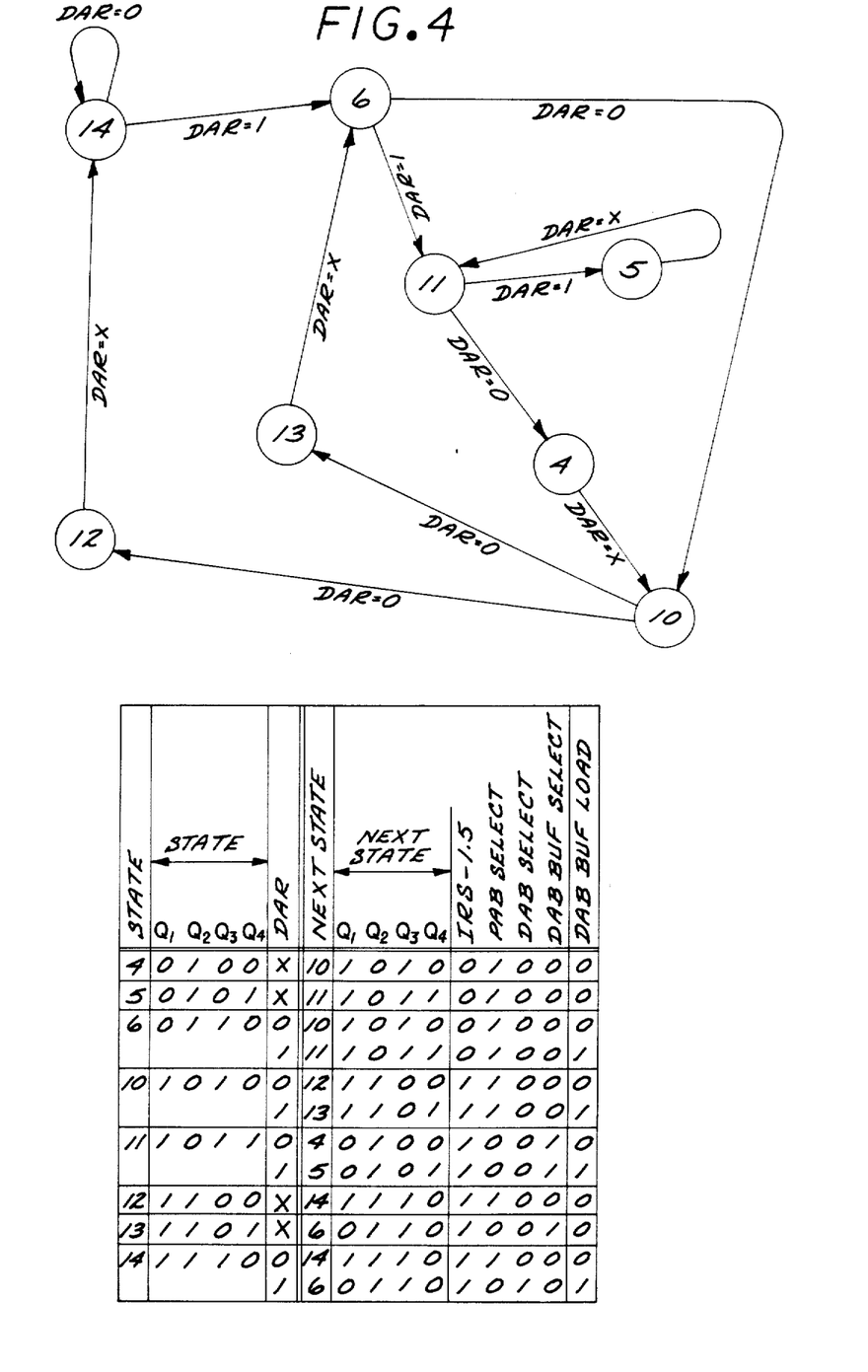
FIG. 4 is a state diagram and truth table illustrating operation of the state sequencer of the preferred embodiment.

The function of the DOB generator 45 is to generate the micro-timing slots (IRS signal), to serve as a bus arbitrator for the DAB, DAB Buffer and PAB Buses and to increment the program counter FIG. 4 shows the state. Map for all possible DOB states and the required conditions for movement from state to state.

As mentioned earlier, instructions may be classified into two types:
  A. Those that fetch an operand; i.e., create a data slot. (Type II)
  B. Those that do not fetch an operand; i.e., do not create a data slot. (Type I)

The rules for interleaving the data slots and instruction fetches are:
  1. The data slot for instruction N, if required, is created immediately after the fetch of Instruction N+2.

2. An instruction fetch immediately follows every data slot.

The DOB generator 45 selects either a data address or an instruction address. The result of the fetch will be available as an input to the address instruction decoder 29 three bus cycles later. This is due to the Pipeline structure (hardware delays) of the system.

As previously stated, the address instruction decoder 29 supplies the DOB generator 45 with a control signal called DAR (Data Address Request). In response to a Type II instruction, this signal DAR will be true, and in response to a Type I instruction it will be false.

The following discussion of the DOB generator operation is reflected in the truth table of FIG. 4 and FIGS. 2A to 2E. The table of FIG. 4 illustrates the current state of the processor and the state entered upon changing of DAR. DAR equal to "x" indicates a state which is entered and directly passed through. In addition, the truth table of FIG. 4 indicates the values of the control signals outputted by the DOB generator 45 in each state, and hence the origin of the address supplied to the memory 19. The following discussion begins with the processor in state 14, which is the state the processor enters in response to an externally triggered reset. The processor will remain in state 14 as along as no Type II instructions are decoded (DAR=0).

During this state 14 the signal PAB Select equals "1". The program counter C, 15 is incremented, and its contents are routed to the memory address bus 11. The IRS-1.5 signal will be true, indicating an instruction is on the instruction/data bus 13. The IRS 1.5 signal is a most important one since it establishes the instruction and data slots for the other microprocessor circuits. If in state 14 goes to "1", indicating the address/instruction decoder 29 was presented with a Type II instruction requiring a data fetch, DAR=1, the DAB bus 10 is enabled and its contents are transferred to the memory address bus 11 directly. At the same time the P.C. counter 15 is inhibited from incrementing. The IRS 1.5 signal goes low, and the DOB generator 45 enters State 6.

In State 6, the P.C. counter 15 is incremented. If DAR=0, the contents of the P.C. 15 are put on the memory address bus 11. The IRS 1.5 signal goes high, and the DOB generator 45 enters State 10. If DAR=1, the contents of the P.C. 15 are put on the memory address bus 11, IRS 1.5 is high, the DAB buffer 38 is loaded with the contents of the DAB bus 10. The DOB generator 45 enters State 11.

In State 10, the P.C. 15 is incremented. If DAR=0, the contents of the P.C. are put on the Address Bus, IRS 1.5 is high and the DOB generator 45 enters State 12. If DAR=1, the contents of P.C. 15 are put on the memory address bus 11, IRS 1.5 is high, the DAB buffer 38 is loaded from the DAB bus 10, and the DOB generator 45 enters State 13.

In State 11, the P.C. 15 is inhibited from counting. If DAR=0, the contents of the DAB buffer 38 are put on the memory address bus 11, IRS 1.5 stays high, and the DOB generator 45 enters State 4. If DAR=1, the contents of the DAB buffer 38 are put on the memory address bus 11 followed by the loading of the register with new information contained on the DAB bus. The IRS 1.5 signal is high, and the DOB generator 45 enters State 5.

For states 4, 5, 12 and 13, the address/instruction decoder 29 is inactive because data was on the I/D bus 13, known because IRS +0.5 is low as shown in FIG. 2.

In State 4, the P.C. 15 is incremented and its contents are put on the memory address bus 11. IRS 1.5 is low, indicating data is present on the instruction/data bus 13. The DOB generator 45 enters State 10.

In State 5, the P.C. 15 is incremented and its contents are put on the memory address bus 11. The DAB buffer 38 is loaded with the contents of the DAB bus 10. IRS 1.5 is low, and the DOB generator enters State 11.

In State 13, the P.C. 15 is inhibited from counting. The contents of the DAB buffer 38 are put on the memory address bus 11. IRS 1.5 is high and the DOB generator 45 enters State 6.

In State 12, the P.C. 15 is incremented, and its contents are put on the memory address bus 11. IRS 1.5 is high and the DOB generators 45 enters State 14.

Thus, the functions of the DOB generator 45 are to generate the micro-timing slots (IRS signal), to serve as a bus arbitrator for the DAB, DAB Buffer and PAB buses and to increment the program counter 15.

Figure 5:
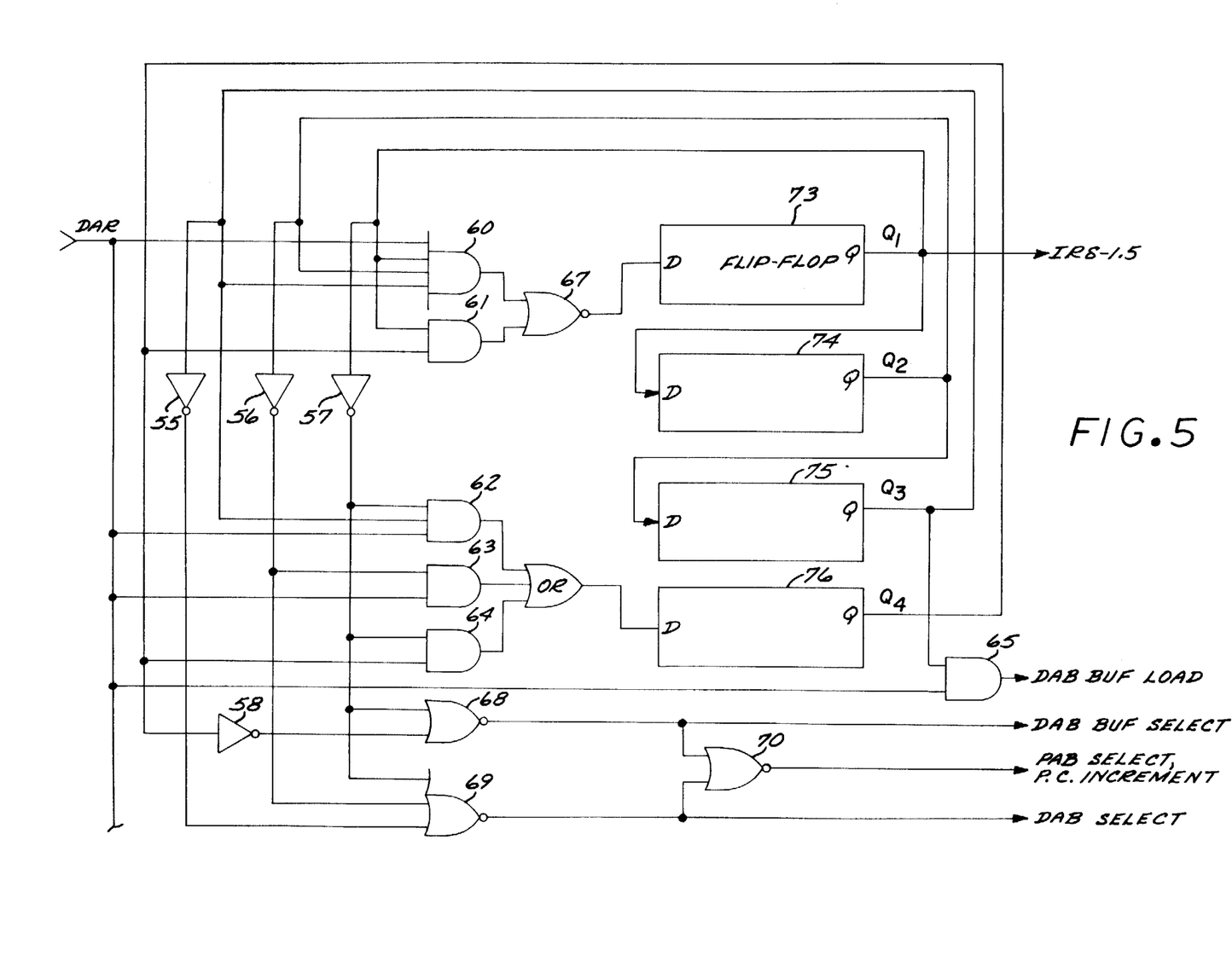
FIG. 5 is a logic diagram of the state sequencer.

A logic implementation of the DOB generator 45 is shown in FIG. 5. It includes a number of inverters 55, 56, 57, 58; a number of AND gates 60, 61, 62, 63, 64; a number of NOR gates 67, 68, 69, 70; and four D flip-flops 73, 74, 75, 76; interconnected as shown. The flip-flop outputs are respectively $Q_1$, $Q_2$, $Q_3$ and $Q_4$, which appear in the truth table of FIG. 4. The input to the DOB generator 45 is DAR, and the outputs generated include IRS-1.5, and control signals DAB BUF LOAD; DAB BUF SELECT, PAB SELECT/PC INCREMENT; and DAB SELECT. The function of this circuit is illustrated by the DOB generator truth table of FIG. 4, and the state sequence diagram.

At this juncture, some points with respect to the IRS signal may be summarized. This signal is employed to indicate to various units of FIG. 1 whether a data word (operand) or instruction word is present. Due to propagation delays, various delayed versions of the IRS signal are used such as IRS+0.5 and IRSO.

To illustrate further, the DOB logic generates the signal IRS x −1.5 as shown in FIG. 5. As shown in FIG. 2, IRS −1.5 is aligned with the output on the memory address bus 11. When an instruction is on the memory address bus 11, IRS −1.5 is high; when a data address AD is present, IRS −1.5 is low.

Figures 2C, 2D:
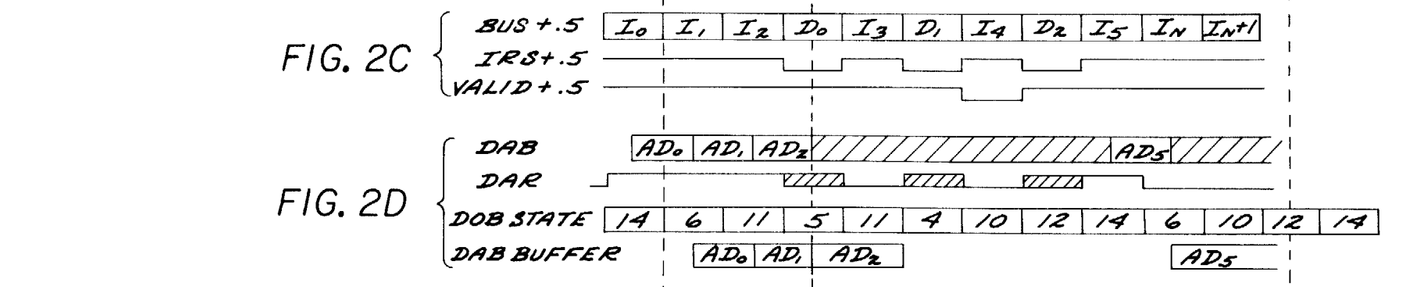
FIG. 2C illustrates the timing of decoder inputs relative to other operations of FIG. 2.
FIG. 2D illustrates the timing of appearance of addresses at points in the structure of FIG. 1 and relative data address request and control states.

As the signal Bus +0.5 of FIG. 2C indicates, the input to the address instruction decoder 29 receives the contents outputted onto the instruction/data bus 13 one-half cycle after that output occurs, and two cycles after the address appears on the memory address bus 11. Therefore, the IRS −1.5 signal is delayed two cycles to produce the signal IRS +0.5 in order to properly indicate to the address instruction decoder 29 whether its input is an instruction or data entity. As explained herein, the address-instruction decoder 29 is disabled by data arrival.

Figure 2E:
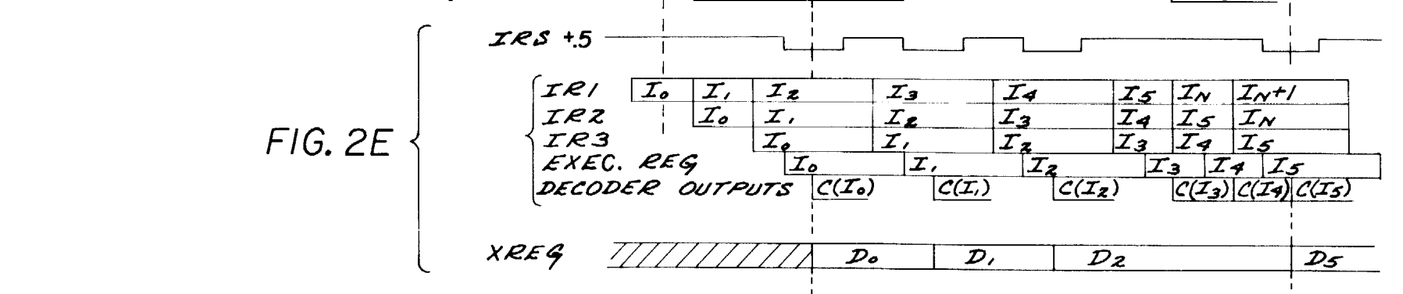
FIG. 2E illustrates timing and positioning of instruction register contents, execution register contents, X register contents, and the related signal.

It will also be observed from the nomenclature employed that the signal IRSO is IRS x −1.5 delayed by 1.5 cycles. As illustrated in FIG. 1, IRSO is provided by the DOB generator 53 of FIG. 1 to the instruction register 27. As indicated by FIG. 2E, IRSO is further delayed such that IRS +0.5 is used to control the actual shifting operations of register 27. The overall consideration is to properly align a signal indicating instruction or data arrival at the decoder 29, or at the instruction register 27 or XREG 45, as illustrated in FIG. 2E. The subject IRS delays of the preferred embodiment are associated with the timing constraints of the preferred NMOS logic. Those skilled in the art will readily recognize other adaptations in accordance with the invention.

Figure 3:
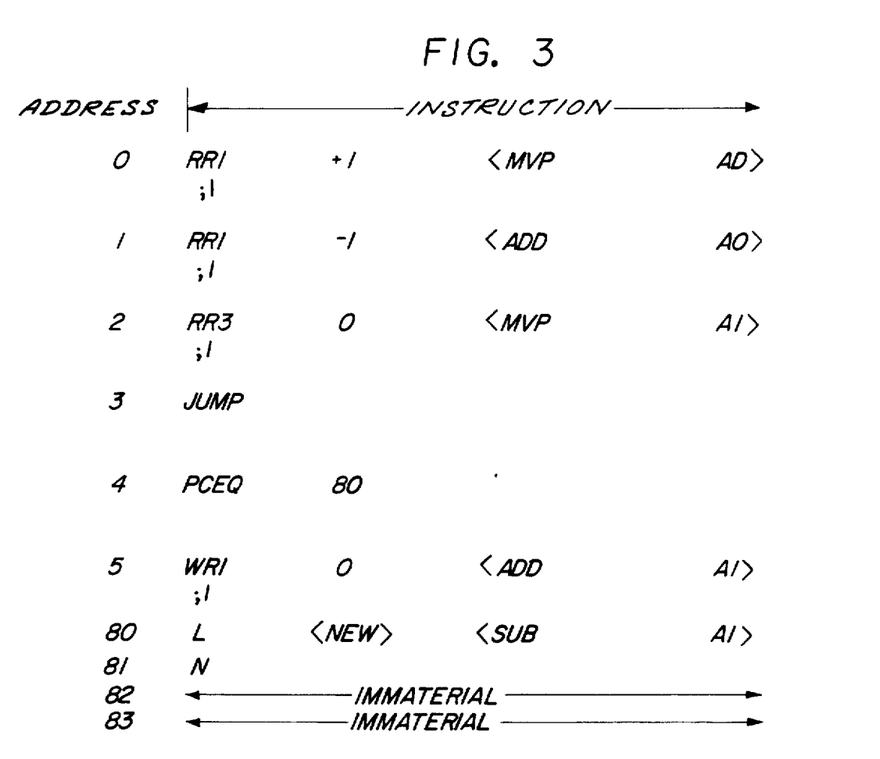
FIG. 3 is a typical program segment useful in illustrating the preferred embodiment.

An example of operation will now be presented with reference to FIG. 2 and FIG. 3. We assume the previous history of the machine was such that three instructions in a row will be fetched from the memory 19, each of which requires a data fetch. FIG. 3 shows a segment of a routine which requires such a series of instructions.

In FIG. 2, $I_0$, $I_1$, $I_2$ each require a data slot. $I_0$ is decoded as quickly as possible and the address $AD_0$ for the data slot required by $I_0$ is placed on the DAB 10, and thence to the memory address bus 11 as quickly as possible. Note that the combination of the memory delay and minimum decoder delay requires three clock cycles between the time zero, the time the address for $I_0$ is on the memory address bus 11, until the time $AD_0$ appears on the bus. $I_1$ reaches the I/D bus 13 adjacent to $I_0$, but according to the operating rule for the DOB generator 45, the Address "3" for $I_3$ was placed on the address bus prior to placing $AD_1$, the address for the data for $I_1$, on the address bus 11. This results in 4 units of delay between $I_1$ being on the I/D bus 13 and $I_1$'s data, $D_1$, being on the I/D bus 13. Similarly, $I_2$'s data $D_2$ does not go onto the I/D bus 13 until after $I_4$ is fetched, and this results in 5 units of delay between the time when $I_2$ is on the I/D bus 13 and when $D_2$ is on the I/D bus 13.

Meanwhile, the instructions $I_0$, $I_1$, $I_2$ go into the instruction register 27 under control of the IRSO signal (shown in FIG. 2E). When a data slot is generated, IRSO goes low, so there will be no shift when a data slot is appearing on the I/D bus 13. Thus, instruction $I_0$ reaches the execution register 36 ½ clock cycle before the data $D_0$ is mapped into the data register 44. (This is seen in FIG. 2E on lines EXEC REG and X REG). Then the decoder output $C(I_0)$ is supplied to the ALU 41 at the same time as $D_0$ via the framing register 39.

FIGS. 2D and 2A show the action of the elastic buffer 35 in conjunction with the DOB generator 45. This is particularly seen by comparing the DAB bus output "DAB" to the I/D bus 13. $AD_0$ appears on the DAB bus 10 one cycle after $I_0$ appears on the I/D bus 13. $AD_1$ appears on the DAB bus 10 one clock cycle after $I_1$ appears on the I/D bus 13 and is buffered by the elastic buffer 35 in its data address buffer 38. Concurrently with this buffering, the address of instruction 3 is placed on the address bus. The buffer's action is seen, since not until after "3" on the address bus does $AD_1$ appear on the address bus. Thus, $AD_1$ was stepped from the data address generator 33 to the DAB buffer to the 38 memory address bus 11.

The data address $AD_2$ is delayed in the DAB buffer 38 (FIG. 2D) longer to permit both $AD_1$ and "4" to appear on the memory address bus 11. Address $AD_2$ can remain in the buffer 38 for 2 cycles because of $D_0$'s arrival in the data register 44. That is, the arrival of $D_0$ disables the decoder 29 by the action of IRS +0.5. Hence, no new data address can be generated.

FIG. 3 shows a series of instructions resulting in the patterns shown in FIG. 2. In FIG. 3, the symbol ";1" indicates that a data slot is associated with the instruction appearing immediately above the symbol. The first instruction, $I_0$, is a "Read at Register 1" or RR1 instruction which requires a data fetch, combined with a "move positive to $A_0$" or "MVP" operation. The second instruction $I_1$ is a RR1-1 and Add to $A_0$. (Notice that $I_0$ includes a +1 which is an increment for the index register so that the next fetch at this register would be from the next higher memory location.) The third instruction $I_2$ is a "Read Register 3" RR3 and "move positive to $A_1$". The fourth instruction $I_3$ is a "Jump". Instruction $I_4$ gives the destination of the jump. It will be noted that the Valid +0.5 signal (FIG. 2) goes low, indicative of the fact that $I_4$, the jump address, is not a valid instruction, i.e., one requiring decoding. Instruction $I_5$ is a "Write at Register 1" instruction. Since the second instruction $I_1$ contained a decrement (−1), we would have repointed register 1 back to the first memory location, i.e., the location read by the first RR1 instruction.

Because of delays through the machine, the PC 15 is not affected by the Jump until instruction $I_4$, the destination of the Jump, appears on the I/D bus 13. Therefore, instruction $I_5$ will still be fetched from the old value of the PC 15. When $I_4$ appears on the I/D bus 13, the PC 15 is modified so that the next fetch is for instruction $I_{80}$ from memory location 80. The "jump" and "PC equals" instructions at addresses 3 and 4 require no data slot. Therefore, by the action of the DOB generator 45, a stream of 3 instructions in a row without any intervening data slot occurs after address $AD_2$. The "Write at Register 1" instruction $I_5$ results in the address $AD_5$ being inserted 3 slots after the address "5" is on memory address bus 11. (See FIG. 2) Because of operation of the DOB generator 45, the instructions are operated on as uniformly as possible, while maintaining $D_2$ available for several slots.

The ALU 41 may have operations longer than a single cycle. The IRSO and nature of the instruction register 27 can be used to inhibit second execution of IR3. One can achieve elasticity by using the delay of the I register 27.

Figure 6:
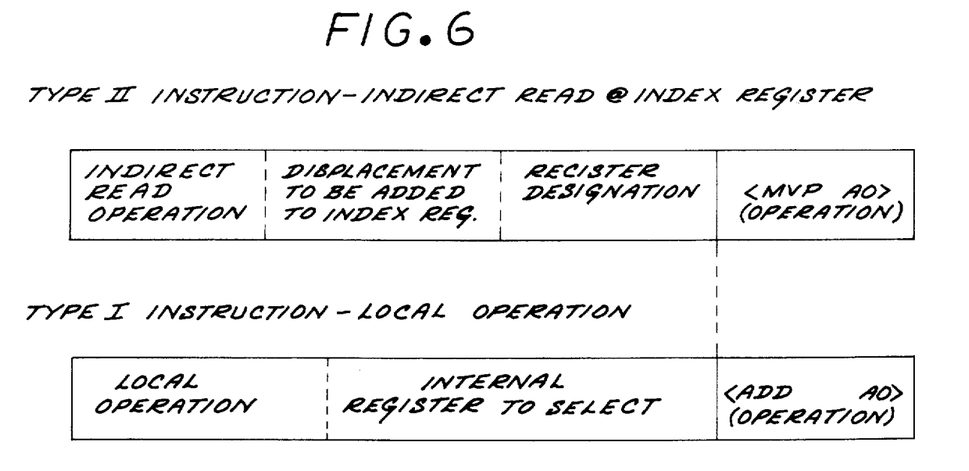
FIG. 6 shows illustrative instruction formats.

FIG. 6 shows illustrative instruction formats. FIG. 6A is a Type II instruction. The particular one illustrated is an indirect read. The first segment of the instruction indicates the type of data fetch. The second segment indicates the displacement to be added to the index register contents. The third segment gives the index register designation. These three segments constitute the Operand-Fetch rule. The fourth segment gives the Operation to be performed.

FIG. 6B shows an illustrative Type I instruction. The first bit segment indicates that a particular register's contents are to be used as an operand. Note that a register fetch does not require a bus cycle. The second segment indicates the identity of the register, and the third segment indicates an operation to be performed. For example, this instruction might say "take the contents of a register and add it to the contents of the accummulator." An advantage of the particular architecture of the invention is that there is flexibility in use of the bit positions of instructions, i.e., there are no rigid requirements to the instruction formats.

Those skilled in the art will recognize that the preferred embodiment described above is subject to numerous modifications and adaptations. Therefore, it is to be understood that, within the scope of the appended claims, the invention may be practiced other than as specifically described herein.

What is claimed is:

1. In a computer processor, the structure comprising:
  memory means for storing instructions and operands and addressable during each of a series of addressing intervals by one address comprising either an operand address or an instruction address and responsive to an operand address for outputting an operand and to an instruction address for outputting an instruction;

a data bus for conducting the operands and instructions outputted by said memory means;

address instruction decoder means for receiving an instruction from said data bus and for decoding said instruction and providing a data address request signal indicating whether the instruction does or does not require an operand fetch and for providing address control signals;

address generation means for receiving said address control signals from said address instruction decoder means and responsive thereto for producing operand addresses for said memory means and for producing instruction addresses;

means supplied with said operand and instruction addresses and responsive to a first control signal to apply a said instruction address to said memory means, responsive to a second control signal to apply a said operand address to said memory means, responsive to a third control signal to buffer a said operand address thereby producing a buffered operand address, and responsive to a fourth control signal to apply a said buffered operand address to said memory means; and logic means responsive to said data address request signal for generating said first, second, third and fourth control signals.

2. The structure of claim 1 wherein said logic means sequences said first, second, third and fourth control signals such that one of said instruction or operand addresses is presented to said memory means during each said memory addressing interval.

3. The structure of claim 2 further including means for performing operations on said operands in accordance with said instructions; and means for receiving said instructions and said operands from said data bus and responsive to a fifth control signal for buffering said instructions and said operands and for supplying a buffered instruction, and a buffered operand to said operation performing means; and wherein said logic means produces said fifth control signal and sequences said fifth control signal such that operands and instructions are provided to said operation performing means in proper order for performing said operations.

4. A microprocessor comprising:

memory means for storing instructions and operands and addressable during successive units of time for outputting during each unit of time one data item comprising either a selected instruction or a selected operand;

an address bus means for serially conducting addresses to said memory means;

an output bus means for receiving instructions and operands outputted by said memory means and for conducting said instructions and said operands;

operation means for receiving the instructions and operands conducted by said output bus means and for performing operations on said operands in accordance with said instructions; and control means for receiving said instructions from said output bus means and for decoding said instructions and responsive to said decoding for generating instruction addresses and data addresses and serially applying them to said address bus means in such an order that said memory means is addressed by either an instruction or operand address conducted by said address bus means during each said unit of time in which an address may be presented to said memory means.

5. The microprocessor of claim 4 wherein said control means functions further to provide a control signal to said operation means, said operation means being responsive to said control signal to shift said instructions received from said output bus means in the correct sequence for performing of said operations.

6. The microprocessor of claim 4 wherein said operation means comprises:

instruction register means for storing instructions received from said output bus means and outputting a sequence of said instructions;

operation decoder means for receiving the first of said sequence of instructions and decoding it to produce a command output;

data register means for receiving at least one operand from said output bus means, and for storing and outputting said at least one operand; and means for receiving said at least one operand from said data register means and a said command output from said operation decoder means and for performing an arithmetic operation employing said at least one operand as directed by said command output.

7. The microprocessor of claim 5 wherein said control means controls said instruction register means and said data register means to cause either a first operation wherein an operand is taken from said output bus means and stored in said data register means or to cause a second operation wherein at least one of said sequence of instructions is applied to said operation decoder means.

8. The microprocessor of claim 7 wherein said control means effects said control of said instruction register means and said data register means by a single control signal.

9. The microprocessor of claim 7 wherein said first and second operations are ordered by said control means such that each operand required by an instruction decoded by said operation decoder means is available to said means for performing arithmetic operations from said data register means.

10. The microprocessor of claim 4 wherein said control means comprises:

program counter means for outputting a program count;

operand address generator means for outputting operand addresses;

an address instruction decoder means for decoding an instruction supplied by said output bus means and providing address control signals to said operand address generator and to said program counter and for providing an operand fetch signal indicating that a decoded instruction requires an operand fetch;

a buffer means having an output and responsive to a buffer control signal for buffering an operand address outputted by said operand address generator;

gate means responsive to a first control signal for gating the count of said program counter to said address bus means, to a second control signal for gating the output of said operand address generator to said address bus means, and to a third control signal for gating the output of said buffer means to said address bus means; and control signal generating means responsive to said operand fetch signal for producing said first, second and third control signals and said buffer control signal.

11. The microprocessor of claim 10 wherein said control signal generating means is responsive to said operand fetch signal to produce a fifth control signal and further including:
  instruction register means responsive to said fifth control signal for storing and outputting a sequence of instructions received from said output bus means;
  operation decoder means for decoding an instruction outputted by said instruction register means and outputting a command;
  data register means responsive to said fifth control signal for storing and outputting an operand; and
  means for receiving a said command from said operation decoder means and an operand from said data register means and responsive to said command to perform an arithmetic operation employing the received operand.

12. The microprocessor of claim 11 wherein said instruction register means is a shift register which stores a plurality of said instructions received from said output bus means and shifts said plurality of instructions in response to said fifth control signal.

13. A microprocessor comprising:
  an operation execution means responsive to supplied instructions for performing operations on supplied operands;
  a memory means having a single address bus and a single output bus and addressable during successive cycles by a serial sequence of addresses including instruction addresses and operand addresses applied on said address bus and responsive to said addresses to output a corresponding serial sequence of instructions and operands, a said instruction including information indicating an operation to be performed by said operation execution means, a said operand to be operated upon by said operation execution means, said operation execution means being connected to receive instructions and operands from said output bus;
  means for receiving instructions from said output bus for generating instruction and operand addresses, and for producing a signal indicating whether a received instruction does or does not require an operand from said memory means; and
  means responsive to said signal indicating whether a said instruction does or does not require an operand from said memory means for sequentially interleaving said instruction addresses and operand addresses on said address bus and for ordering presentation of instructions and operands outputted by said memory means to said operation execution means such that an instruction or operand address is presented each cycle to said memory means and a corresponding instruction or operand is outputted on said output bus each cycle and such that instructions and corresponding operands arrive in correct sequence for execution at said operation execution means.

14. In a microprocessor having a means for generating instruction and operand addresses for a memory, said memory being addressable by one of said addresses during each of a series of addressing intervals to output either an instruction or an operand, the apparatus comprising:
  buffer means for buffering an operand address generated by said generating means to produce a buffered operand address;
  means supplied with instructions outputted from said memory for generating a signal indicating an instruction outputted from said memory does or does not require an operand fetch; and
  control means responsive to said signal to generate control signals indicating whether in a particular addressing interval (1) a buffered operand address is to be applied to said memory, (2) an unbuffered operand address is to be applied to said memory, or (3) an instruction address is to be applied to said memory, and for applying an instruction address, an operand address or a buffered operand address to said memory in accordance with said control signals.

15. The improvement of claim 14 wherein said microprocessor includes means for performing arithmetic operations on operands outputted from said memory in accordance with said instructions and wherein said control means further produces a control signal which orders application of operands and instructions to said means for performing arithmetic operations.

16. The improvement of claim 14 or 15 wherein said control means functions such that an address is applied to said memory means during each said addressing interval.

* * * * *